(12) United States Patent
Khosla

(10) Patent No.: US 12,348,471 B2
(45) Date of Patent: Jul. 1, 2025

(54) METHODS FOR MANAGING SPAM COMMUNICATION AND DEVICES THEREOF

(71) Applicant: Vinod Khosla, Portola Valley, CA (US)

(72) Inventor: Vinod Khosla, Portola Valley, CA (US)

(*) Notice: Subject to any disclaimer, the term of this patent is extended or adjusted under 35 U.S.C. 154(b) by 64 days.

(21) Appl. No.: 17/534,709

(22) Filed: Nov. 24, 2021

(65) Prior Publication Data

US 2022/0182347 A1    Jun. 9, 2022

Related U.S. Application Data

(60) Provisional application No. 63/117,973, filed on Nov. 24, 2020.

(51) Int. Cl.
| | |
|---|---|
| *G06F 13/00* | (2006.01) |
| *H04L 9/40* | (2022.01) |
| *H04L 51/212* | (2022.01) |
| *H04L 51/42* | (2022.01) |

(52) U.S. Cl.
CPC ........... *H04L 51/212* (2022.05); *H04L 51/42* (2022.05); *H04L 63/1433* (2013.01)

(58) Field of Classification Search
CPC ....... H04L 51/212; H04L 51/21; H04L 51/42; H04L 63/1433; H04L 63/14; H04L 63/0227; H04L 63/1408
USPC ......... 709/204–206, 224, 223; 715/751–759; 726/26, 2–4; 706/23, 16, 15
See application file for complete search history.

(56) References Cited

U.S. PATENT DOCUMENTS

| | | | |
|---|---|---|---|
| 7,752,274 B2* | 7/2010 | Pagan | H04L 51/212 709/206 |
| 8,631,495 B2* | 1/2014 | Judge | H04L 63/0245 713/188 |
| 9,231,899 B2* | 1/2016 | Balasubramanian | H04L 51/224 |
| 9,300,679 B1* | 3/2016 | Martin | H04L 63/1433 |
| 9,503,406 B2* | 11/2016 | Wilson | H04L 51/212 |
| 10,140,592 B2* | 11/2018 | Wheeler | H04L 51/216 |
| 10,204,157 B2* | 2/2019 | Kim | H04L 51/10 |
| 10,419,478 B2* | 9/2019 | Syme | H04L 63/126 |
| 10,970,188 B1* | 4/2021 | Åvist | H04L 63/1441 |
| 11,044,267 B2* | 6/2021 | Jakobsson | H04L 63/123 |
| 11,303,599 B2* | 4/2022 | Thomas | H04W 4/12 |
| 2007/0233787 A1* | 10/2007 | Pagan | G06Q 10/107 709/206 |
| 2010/0211645 A1* | 8/2010 | Wang | G06F 21/40 709/206 |

(Continued)

OTHER PUBLICATIONS

M. Hassan Shirali-Shahreza et al.; An Anti-SMS-Spam Using Captcha; 2008 ISECS International Colloquium on Computing, Communication, Control, and Management; 2008 (Year: 2008).*

(Continued)

*Primary Examiner* — Kenneth R Coulter
(74) *Attorney, Agent, or Firm* — Troutman Pepper Locke LLP

(57) ABSTRACT

Disclosed technology includes receiving a communication from a communication sending device. It is determined whether the received communication from the communication sending device is a spam communication. A response comprising one or more tasks is generated when the received communication is determined as spam communication. The generated response comprising one or more tasks is sent to the communication sending device.

19 Claims, 4 Drawing Sheets

(56) References Cited

U.S. PATENT DOCUMENTS

| | | | |
|---|---|---|---|
| 2012/0204265 A1* | 8/2012 | Judge | H04L 63/145 |
| | | | 726/22 |
| 2013/0185361 A1* | 7/2013 | Balasubramanian ... | H04L 51/52 |
| | | | 709/206 |
| 2015/0180812 A1 | 6/2015 | Wilson | |
| 2016/0125420 A1* | 5/2016 | Wheeler | G06Q 30/016 |
| | | | 705/304 |
| 2016/0191453 A1* | 6/2016 | Thomas | H04L 51/226 |
| | | | 709/206 |
| 2017/0126601 A1* | 5/2017 | Kim | H04L 51/222 |
| 2019/0014143 A1* | 1/2019 | Syme | H04L 63/1441 |
| 2019/0199745 A1* | 6/2019 | Jakobsson | H04L 63/1483 |

OTHER PUBLICATIONS

International Search Report and Written Opinion for PCT/US2021/060687, dated Feb. 18, 2022.
PCT/US2021/060687, International Preliminary Report on Patentability dated May 30, 2023.
Extended European Search Report for EP Application No. 21899063.8, dated Sep. 23, 2024.

* cited by examiner

METHODS FOR MANAGING SPAM COMMUNICATION AND DEVICES THEREOF

This application claims the benefit of U.S. Provisional Patent Application Ser. No. 63/117,973, filed Nov. 24, 2020, which is hereby incorporated by reference in its entirety.

FIELD

This technology generally relates to methods for managing communication classified as spam and devices thereof.

BACKGROUND

Increasingly, communications between individuals and businesses occur by electronic means across a variety of networking environments. For example, e-mail is one of the most commonly and widely used services for communication. With the widespread use of e-mail and other electronic communications, the problem associated with communication that can be classified as spam and other unwanted or unsolicited communications is also increasing. Spam takes many forms, including unsolicited communications, unwanted commercial communications, phishing schemes and other fraudulent communications, advertisements and discount offers (often unwanted) of a particular product or service. Such communications occur in e-mail, text messages, internet postings or other electronic formats, and are often sent to a large number of recipients or posted in a large number of places. Such unwanted or unsolicited communication that not only consumes network resources, occupies network bandwidth, wastes valuable time and internet access costs, but also seriously threatens network security.

Technologies to make communication more user friendly and secure have been developed particularly to combat spam. Some of the techniques used by these technologies are routine, well-understood, and conventional. For example, known methods to filter spam emails includes black listing of the senders, gray listing that requires re-access of the mail server to send, and contextual filtering of data. While these techniques help with filtering of the spam messages, they do little to deter the sender from continuing to send such messages. The technological problem associated with the prior technologies is that the costs of terms of time, money, and security fall disproportionately on the receiver, which only serves to increase the use of spam. There is therefore a need for an improved systems and methods that provides a response back to the sender of the spam that would result in cost or other deterrence to the spam sender.

SUMMARY

A method for managing communication classified as spam includes receiving a communication from a communication sending device. It is determined whether the received communication from the communication sending device is a spam communication. In this example, artificial intelligence may be used to determine if email is spam (e.g. separating on order confirmation from a bona fide retailer versus spam email promotions). Further determination of what is spam may be based on the receiver of email and their preferences or their willingness to train the spam filter. A response comprising one or more tasks is generated when the received communication is determined as spam communication. The generated response comprising one or more tasks is sent to the communication sending device.

A non-transitory computer readable medium having stored thereon instructions for managing communication classified as spam comprising executable code, which when executed by at least one processor, cause the processor to receive a communication from a communication sending device. By way of example, communications received could be emails, voice calls generated automatically by an agent or other means. Serial conversations are likely with the sender to maximize cost to "negotiate" to an outcome. Spam mail may involve responding to an address or phone different than the reply address based on the outcome of an artificial intelligence model. It is determined whether the received communication from the communication sending device is a spam communication. A response comprising one or more tasks is generated when the received communication is determined as spam communication. The generated response comprising one or more tasks is sent to the communication sending device.

A spam communication manager apparatus includes a memory coupled to the processor which is configured to be capable of executing programmed instructions comprising and stored in the memory to receive a communication from a communication sending device. It is determined whether the received communication from the communication sending device is a spam communication. A response comprising one or more tasks is generated when the received communication is determined as spam communication. The generated response comprising one or more tasks is sent to the communication sending device.

DETAILED DESCRIPTION

Figure 1:
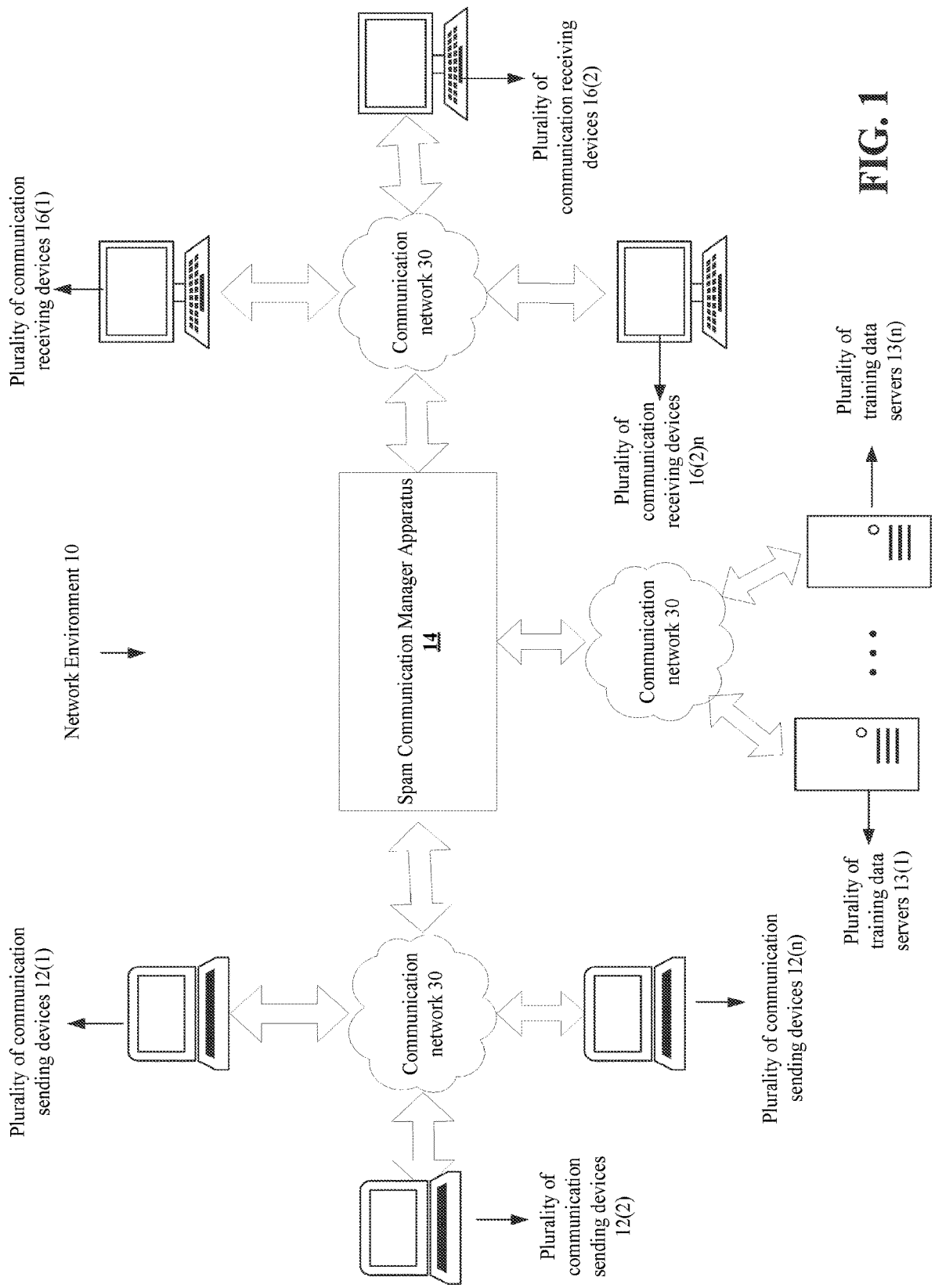
FIG. 1 is a block diagram of an environment with an example of a spam communication manager apparatus that manages spam communication efficiently.
Figure 2:
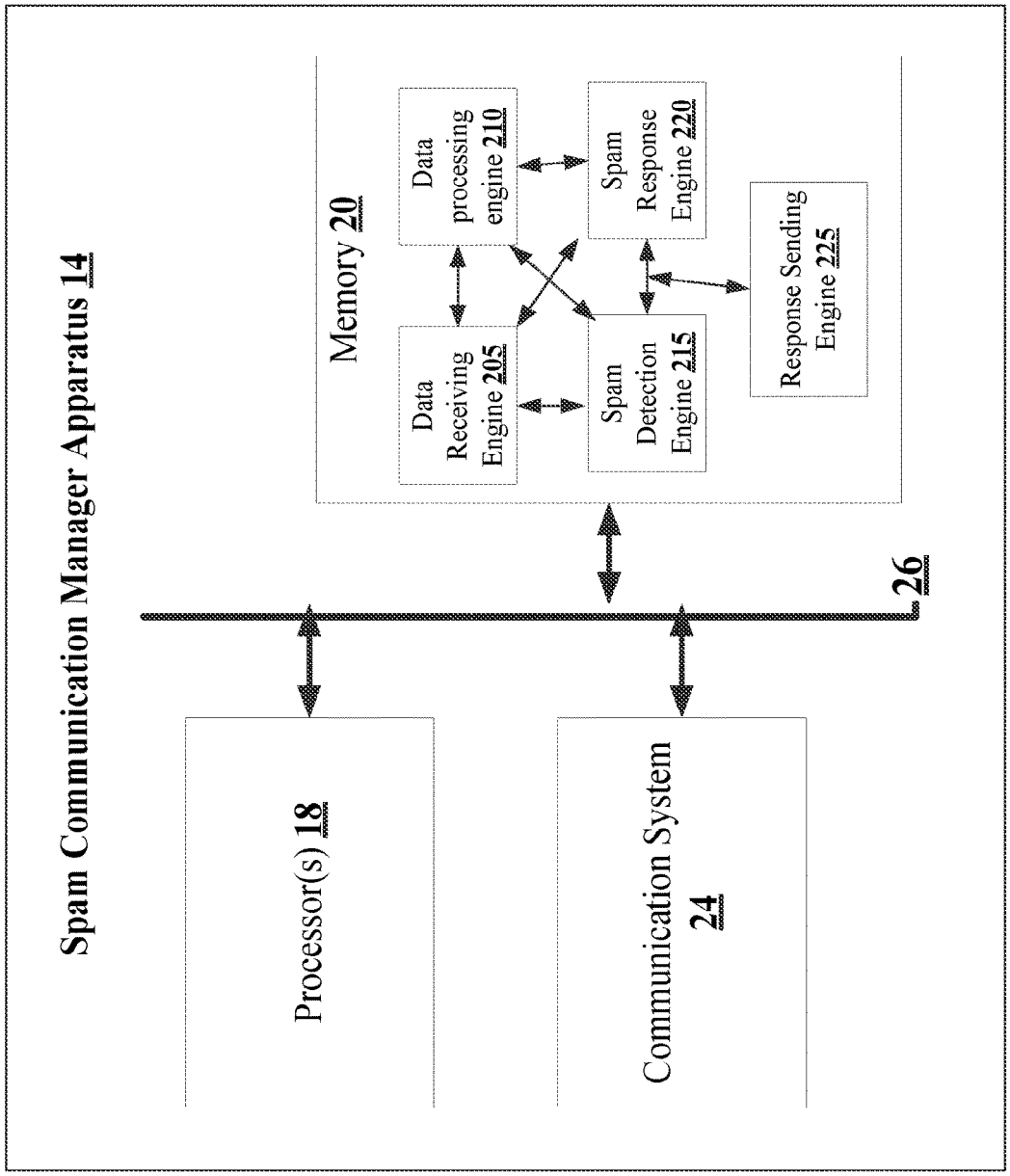
FIG. 2 is a block diagram of the example of the spam communication manager apparatus shown in FIG. 1.
Figure 3:
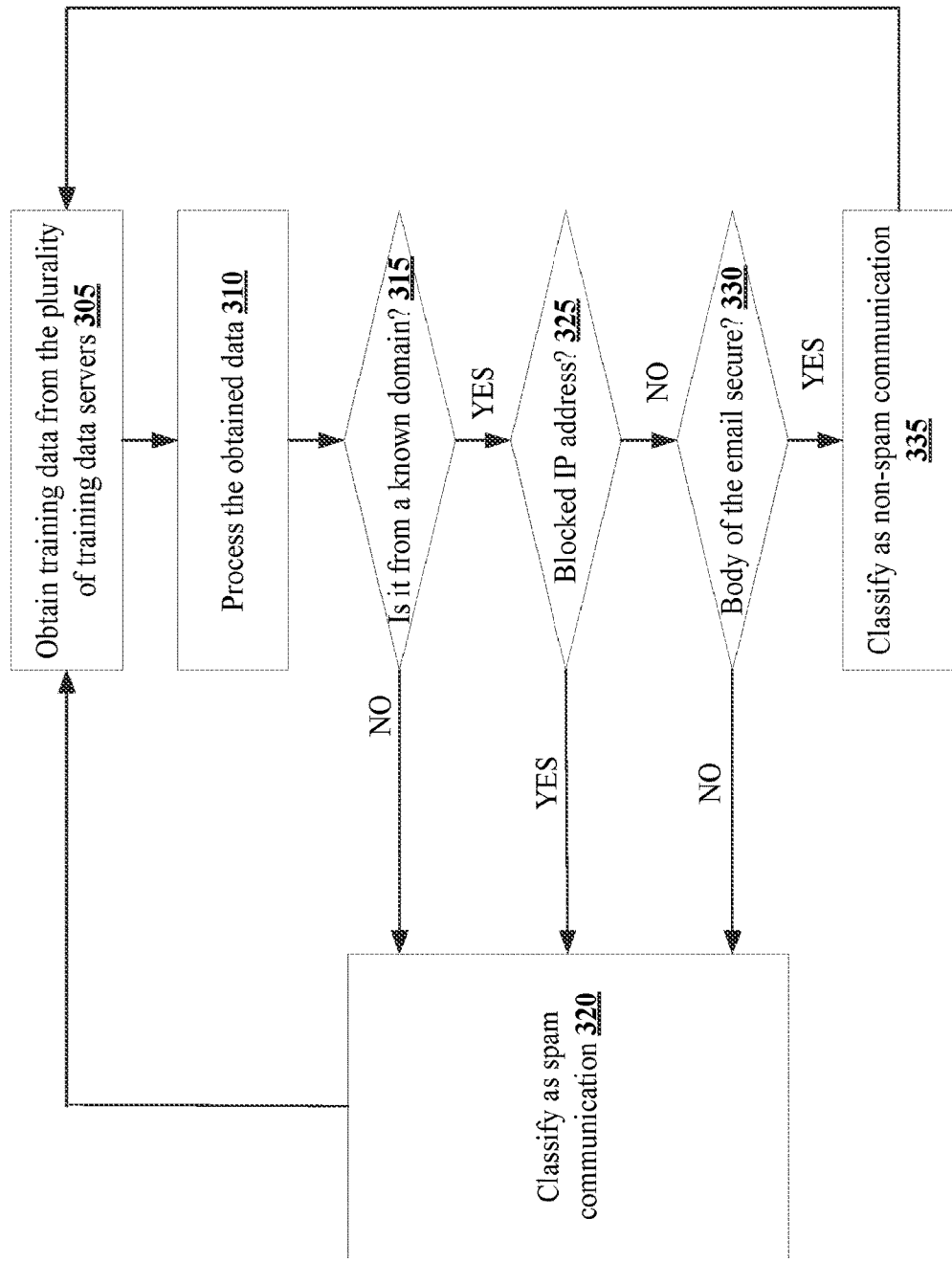
FIG. 3 is a flowchart of an example of a method for training artificial intelligence models.

An exemplary network environment 10 with an example of a spam communication manager apparatus 14 is illustrated in FIGS. 1-2. In this particular example, the environment 10 includes the spam communication manager apparatus 14, a plurality of communication sending devices 12(1)-12(n), a plurality of training data servers 13(1)-13(n), a plurality of communication receiving devices 16(1)-16(n) coupled via one or more communication networks 30, although the environment could include other types and numbers of systems, devices, components, and/or other elements as is generally known in the art and will not be illustrated or described herein. This technology provides a number of advantages including providing methods, non-transitory computer readable medium, and apparatuses that effectively manages spam communication.

Referring more specifically to FIGS. 1-2, the spam communication manager apparatus 14 is programmed to provide efficient methods to accurately filter out spam communication and intelligently send an automated response to the spam sender; although the apparatus can perform other types and/or numbers of functions or other operations. In this particular example, the spam communication manager apparatus 14 includes a processor 18, a memory 20, and a communication system 24 that are coupled together by a bus 26, although the spam communication manager apparatus 14 may comprise other types and/or numbers of physical and/or virtual systems, devices, components, and/or other elements in other configurations.

The processor 18 in the spam communication manager apparatus 14 may execute one or more programmed instructions stored in the memory 20 for accurately filtering out spam communication and intelligently send an automated response to the spam sender as illustrated and described in the examples herein, although other types and/or numbers of functions and/or other operations can be performed. The processor 18 in the spam communication manager apparatus 14 may include one or more central processing units and/or general purpose processors with one or more processing cores, for example.

The memory 20 in the spam communication manager apparatus 14 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20.

Additionally, as illustrated in FIG. 2, memory 20 includes a data receiving engine 205, a data processing engine 210, a spam detection engine 215, a spam response engine 220, and a response sending engine 225, although the memory 20 can include other types or amounts of engines, modules, or functions could be present within the memory 20. In this example, the data receiving engine 205 assists with receiving the communication from the plurality of communication sending devices 12(1)-12(n), although the data receiving engine 205 may also be configured to receive the communication from the plurality of communication receiving devices 16(1)-16(n).

The data processing engine 210, in this example, assists with processing the received communication from the plurality of communication sending devices 12(1)-12(n) via the data receiving engine 205, although the data processing engine 210 may be configured to perform other functions to assist the spam communication manager apparatus 14 with effectively managing spam communication. In this example, processing the received communication may include converting data to a standardized format or filtering unwanted data, although data processing may include other types of transformation of data.

The spam detection engine 215 within the memory 20 assists with detecting whether the communication received from the plurality of communication sending devices 12(1)-12(n) can be classified as spam after the received communication is processed using the data processing engine 210, although the spam detection engine 215 may be configured to perform other types or amounts of functions. In this example, the spam detection engine 215 may classify the communication received from the plurality of communication sending devices 12(1)-12(n) as spam based on the source IP address, a domain name of the email address from which the communication such as an email can be sent, content of the communication, type of the communication, format of the communication, although spam detection engine 215 may use other parameters to make such classification. Additionally, in this example, the spam detection engine 215 may include a first set of artificial intelligence models that assists with classifying the communication as spam, although the artificial intelligence models may be trained to perform other types or amounts of functions.

The spam response engine 220 within the memory 20 assists with automatically generating a response when the received communication from the plurality of communication sending devices 12(1)-12(n) is classified as spam. In this example, the generated response may require the spam sending device to perform additional operations or task. In an embodiment, performing the additional operations or task results in a cost to the spam sending device. The costs may be temporal, computational, financial or otherwise placing a cost on person or entity sending the communication. Such costs may include one or more tasks that must be performed, customized or expected responses that must be given, credentials that must be provided and the like. Additionally, in this example, the spam response engine 220 may include a second set artificial intelligence models that assists with generating a response if the received communication is classified as spam, although the second set of artificial intelligence models may be configured to perform other types or amounts of functions.

As illustrated in FIG. 2, the memory 20 also includes the response sending engine 225 that assists with sending the generated response from the spam response engine 220 back to the spam sending device, although the response sending engine 225 may be configured to perform other types or amounts of functions.

The communication system 24 in the spam communication manager apparatus 14 operatively couples and communicates between one or more of the plurality of communication sending devices 12(1)-12(n), a plurality of training data servers 13(1)-13(n), and one or more of the plurality of communication receiving devices 16(1)-16(n), which are all coupled together by one or more of the communication networks 30, although other types and numbers of communication networks or systems with other types and numbers of connections and configurations to other devices and elements. By way of example only, the communication networks 30 can use TCP/IP over Ethernet and industry-standard protocols, including NFS, CIFS, SOAP, XML, LDAP, SCSI, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

In this particular example, each of the plurality of communication sending devices 12(1)-12(n) may send data such as email, text messages, internet postings or the like to the plurality of communication receiving devices 16(1)-16(n) via the spam communication manager apparatus 14. Each of the plurality of communication sending devices 12(1)-12(n) may include a processor, a memory, user input device, such as a keyboard, mouse, and/or interactive display screen by way of example only, a display device, and a communication interface, which are coupled together by a bus or other link, although each may have other types and/or numbers of other systems, devices, components, and/or other elements. In this particular example, each of the plurality of communication sending devices 12(1)-12(n) may comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the plurality of communication sending devices 12(1)-12(n) and may transmit data in response to requests from the spam communication manager apparatus 14.

Each of the plurality of the communication receiving devices 16(1)-16(n) may receive the communication or data sent from the plurality of communication sender devices 12(1)-12(n) via the spam communication manager apparatus 14. Each of the plurality of communication receiving devices 16(1)-16(n) may include a processor, a memory, user input device, such as a keyboard, mouse, and/or interactive display screen, a display device, and a communication interface, which are coupled together by a bus or other link, although each may have other types and/or numbers of other systems, devices, components, and/or other elements. In this particular example, each of the communication receiving devices 16(1)-16(n) may comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the communication receiving devices 16(1)-16(n) and may transmit data in response to requests from the spam communication manager apparatus 14.

Each of the plurality of training data servers 13(1)-13(n) assists with providing the data necessary to train the first set of artificial intelligence models and the second set of artificial intelligence models, although the plurality of data servers 13(1)-13(n) may include other types or amounts of data.

Although the exemplary network environment 10 with the spam communication manager apparatus 14, the plurality of communication sending devices 12(1)-12(n), the plurality of training data servers 13(1)-13(n), and the communication receiving devices 16(1)-16(n), and the communication networks 30 are described and illustrated herein, other types and numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

Although the spam communication manager apparatus 14 is illustrated as single device, one or more actions of spam communication manager apparatus 14 may be distributed across one or more distinct network computing devices. Moreover, the spam communication manager apparatus 14 is not limited to a particular configuration. Thus, the spam communication manager apparatus 14 may contain a plurality of computing devices that operate using a master/slave approach, whereby one of the computing devices of the spam communication manager apparatus 14 operate to manage and/or otherwise coordinate operations of the other network computing devices. The spam communication manager apparatus 14 may operate as a plurality of computing devices within cluster architecture, a peer-to peer architecture, virtual machines, or within a cloud architecture.

Thus, the technology disclosed herein is not to be construed as being limited to a single environment and other configurations and architectures are also envisaged. For example, the plurality of communication sending devices 12(1)-12(n), the plurality of training data servers 13(1)-13(n), or the plurality of communication receiving devices 16(1)-16(n) as depicted in FIG. 1 can operate within spam communication manager apparatus 14 rather than as a stand-alone server communicating with spam communication manager apparatus 14 via the communication network(s) 30.

While the spam communication manager apparatus 14 is illustrated in this example as including a single device, spam communication manager apparatus 14 in other examples can include a plurality of devices or blades each with one or more processors, and each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled devices. Additionally, one or more of the devices that together comprise spam communication manager apparatus 14 in other examples can be standalone devices or integrated with one or more other devices or applications, such as one of the plurality of communication sending devices 12(1)-12(n), the plurality of training data servers 13(1)-13(n), or the plurality of communication receiving devices 16(1)-16(n) or, the spam communication manager apparatus 14, or applications coupled to the communication network(s) 30, for example. Moreover, one or more of the devices of the spam communication manager apparatus 14 in these examples can be in a same or a different communication network 30 including one or more public, private, or cloud networks, for example.

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices, apparatuses, and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

An example of a method for managing spam communication will now be described with reference to FIGS. 1-4. In particular, FIG. 3 which illustrates an exemplary method for training the artificial intelligence model to detect spam communication will now be described. In step 305, the spam communication manager apparatus 14 obtains training data including examples of emails that are exchanged from one or more of the plurality of training data servers 13(1)-13(n), although the training data can include other types or amounts of information. By way of example, the emails may include data such as the email address of the sender, the domain name of the email address, subject, time, date, body of the email, and/or the internet protocol (IP) address associated with the sender, although the email can include other types or amounts of information.

Next in step 310, the data processing engine 210 within spam communication manager apparatus 14 processes the obtained training data to convert the obtained training data to a standardized format, although other types of operations may be performed during the step of processing. In this example, converting the obtained training data into a standardized format is helpful to prepare the data for analysis and training. Additionally, in this example, converting the obtained training data into a standardized format also assists with removing redundant data so that the data is more accurate and relevant to train the artificial intelligence models.

Next in step 315, the spam detection engine 215 within the spam communication manager apparatus 14 determines if the email obtained in the training data is from a known domain. In this example, the spam detection engine 215 includes a database that has a list of publicly known domains and some examples of the known domains can include, Gmail®, Hotmail®, Yahoo®, outlook, although the list of known domains can include a list of domains of all corporations or other trusted domains. Additionally, as some domains use a specific format for e-mail originating from that domain, the spam detection engine 215 may also analyze the format of the incoming communication to determine if it originates from the identified domain. Accordingly, if the spam detection engine 215 determines that the domain of the email is not from a known domain, then the "No" branch is taken to step 320.

In step 320, in one example, the spam detection engine 215 within the spam communication manager apparatus 14 classifies the obtained email in the training data as spam and accordingly trains the artificial intelligence model to characterize the email from unknown domains as spam. Further, the exemplary flow proceeds back to step 305 where a new set of training data is obtained from the plurality of training data servers 13(1)-13(n).

Alternatively in another example, the spam detection engine 215 within the spam communication manager apparatus 14 can determine whether the number of characters associated with username of the email address is a threshold number of characters and when it is not, it may characterize the email as spam. In yet another example, the spam detection engine 215 within the spam communication manager apparatus 14 can use the combination of both the username of the email address and the domain of the email address to determine whether the received email is a spam communication. By way of example, if the character count of username of the received email exceeds threshold number and the domain is unknown, the spam detection engine 215 within the spam communication manager apparatus 14 can categorize the email as spam communication.

However, back in step 315, if the spam detection engine 215 within the spam communication manager apparatus 14 determines that the obtained email in the training data is from a known domain, then the "Yes" branch is taken to step 325. Alternatively in another example, the spam detection engine 215 within the spam communication manager apparatus 14 can use the combination of whether a character count of the username of the received email is less than a threshold number and the obtained email to be from a known domain to proceed to step 325.

In step 325, the spam detection engine 215 within the spam communication manager apparatus 14 determines if the source IP address from which the email address was sent is part of a list that includes blocked IP addresses. In this example, the spam detection engine 215 also includes a blocked IP address database which includes the IP addresses that are identified to be generating spam communication. Accordingly, if the spam detection engine 215 within the spam communication manager apparatus 14 determines that the source IP address of the email in the training data is from a blocked IP address, then the "Yes" branch is taken to step 320 that is illustrated above. However, if the spam detection engine 215 within the spam communication manager apparatus 14 determines that the email is not from a blocked IP address, then the "No" branch is taken to step 330.

In step 330, the spam detection engine 215 within the spam communication manager apparatus 14 determines if the body of the email is secure. In this example, the step of determining whether the body of the email is secure involves checking for unsecure hyperlink(s) within the email, suspect attachments, several typographical errors, incorrect name of the recipient of the email, or other known patterns of spam communications; although other parameters may be considered to determine whether the body of the email is secure. Accordingly, if the spam detection engine 215 within the spam communication manager apparatus 14 determines that the body of the email is not secure, then the "No" branch is taken to step 320 which was illustrated above. However, if the spam detection engine 215 within the spam communication manager apparatus 14 determines that the body of the email is secure, then the "Yes" branch is taken to step 335.

In step 335, the spam detection engine 215 within the spam communication manager apparatus 14 classifies the email in the obtained training data as a legitimate or as a non-spam communication and the exemplary flow proceeds to back to step 305 where new set of training data is obtained for the purpose of training the artificial intelligence model(s).

Figure 4:
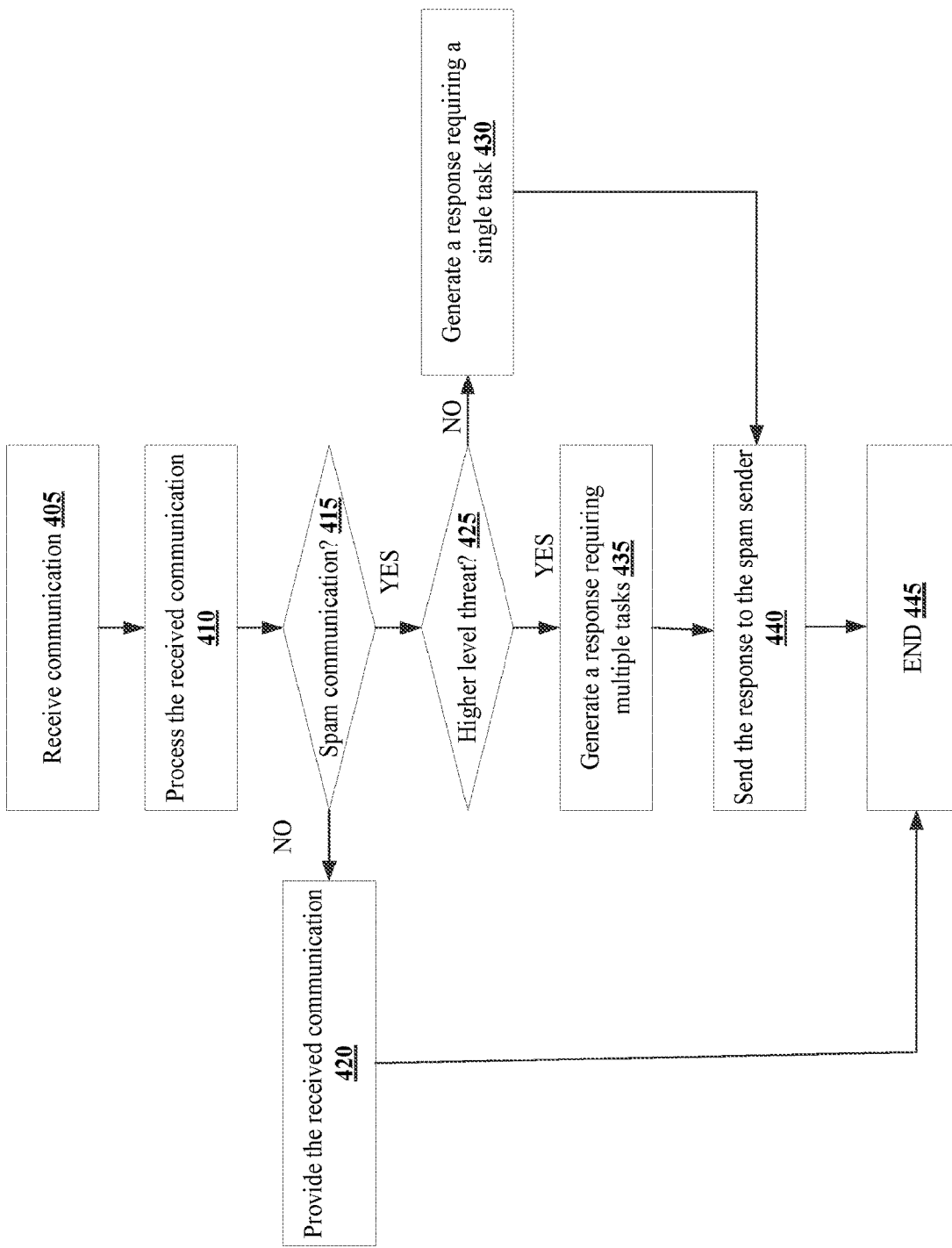
FIG. 4 is a flowchart of an example of a method for generating a response to communication classified as spam.

Now, an exemplary method for generating a response to communication classified as spam using the trained artificial intelligence model will be illustrated with reference to FIG. 4. In step 405, the data receiving engine 205 within the spam communication manager apparatus 14 intercepts the communication that sent from one of the plurality of communication sending devices 12(1)-12(n) directed towards one of the plurality of communication receiving devices 16(1)-16(n). In this example, the communication can include an email, although the communication can include other types or amounts of information. In other examples, the communication be occur via a communication protocol, a conversational artificial intelligence chat, or a series of phone calls.

Next in step 410, the data processing engine 210 within spam communication manager apparatus 14 process the received communication to convert to a standardized format, although other types of operations may be performed during the step of processing. In this example, converting the obtained training data into a standardized format is helpful for further analysis that will be illustrated below.

Next in step 415, the spam detection engine 215 within the spam communication manager apparatus 14 determines whether the email intercepted is spam communication based on the training illustrated above. Accordingly, if the spam detection engine 215 determines that the received communication is not spam, then the "No" branch is taken to step 420.

In step 420, the spam detection engine 215 within the spam communication manager apparatus 14 provides the intercepted email to the corresponding one of the plurality of communication receiving devices 16(1)-16(n) and the exemplary method ends at step 445.

However, back in step 415, if the spam detection engine 215 within the spam communication manager apparatus 14 determines that the intercepted email is classified as a spam, then the "Yes" branch is taken to step 425.

In step 425, the spam detection engine 215 within the spam communication manager apparatus 14 determines the level of security threat offered by the intercepted email that is classified as spam. In this example, the spam detection engine 215 within the spam communication manager apparatus 14 can refer to a database that includes the spam communication and the associated threat level to determine the level of security threat. By way of example, if the email is from an unknown domain and if that unknown domain and the level of threat corresponding to the unknown domain is high, then the spam detection engine 215 within the spam communication manager apparatus 14 determines that the level of security threat is high. In contrast, if the email is from an unknown domain and if that unknown domain and the level of threat corresponding to the unknown domain is medium or low, then the spam detection engine 215 within the spam communication manager apparatus 14 determines that the level of security threat is medium or low. In another example, if the email classified as spam is from a blacklisted IP address, then the corresponding level of threat associated with the spam can be high. In yet another example, if the character count of the username of the email classified as spam is above a threshold number, then the corresponding level of threat associated with the spam can be high.

Accordingly, if the spam detection engine 215 within the spam communication manager apparatus 14 determines that the level of security threat is not high, i.e., medium or low, then the "No" branch is taken to step 430.

In step 430, the spam response engine 220 within the spam communication manager apparatus 14 generates a response that requires a single task to be completed. By way of example, the single task can relate to completing a CAPTCHA challenge. Additionally in this example, the screen of the one of the plurality of communication sending devices 12(1)-12(n) may be frozen until the CAPTCHA challenge is completed. Alternatively, the type of the response may be generated based on the filter mechanism of the sender or the type of spam communication sent by the plurality of communication sending devices 12(1)-12(n). The exemplary flow then proceeds to step 440 which will be further illustrated below.

However, back in step 425, if the spam detection engine 215 within the spam communication manager apparatus 14 determines that the level of security threat is high, then the "Yes" branch is taken to step 435. In step 435, the spam response engine 220 within the spam communication manager apparatus 14 generates a response that requires multiple tasks to be performed by the one of the plurality of communication sending devices 12(1)-12(n) that sent the spam message. By way of example, multiple tasks may involve completing multiple CAPTCHA challenges, although other types of tasks may be provided to the sender of the spam. While in this example a medium or low threat requires only a single task be completed, the number of tasks required for a given threat level may be adjusted. Moreover, the number of relative threat levels may be increased or decreased. In other examples, the generated response could include a request for a conversational artificial intelligence that forces the one of the plurality of communication sending devices 12(1)-12(n) to respond by asking for a customer support representative to unblock the computer used by one of the plurality of communication sending devices 12(1)-12(n) that sent the spam message, or release the computing resources used by the one of the plurality of communication sending devices 12(1)-12(n) that sent the spam message.

Next in step 440, the response sending engine 225 within the spam communication manager apparatus 14 sends the generated response to the one of the plurality of communication sending devices 12(1)-12(n) that sent the spam message. Additionally in this example, the spam detection engine 215 within the spam communication manager apparatus 14 can delete or quarantine the email that is classified as spam without delivering it to one of the plurality of communication receiving devices 16(1)-16(n). The exemplary method ends at step 445.

Accordingly, this technology provides methods, non-transitory computer readable medium, and apparatuses that manages communication classified as spam. By using the techniques illustrated above, the disclosed technology provides a technological solution by generating a response to communication classified as spam thereby adding a cost to the device sending the spam. Particularly, adding the cost to the device sending the spam is not routine, conventional, and well-understood.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A non-transitory computer readable medium having stored thereon instructions comprising executable code for creating a cost to a sender of a spam communication, wherein when said executable code is executed by at least one processor, the executable code causes the at least one processor to:
   intercept the spam communication originating from a communication sending device of the sender of the spam communication and directed to a communication receiving device;
   apply a trained artificial intelligence model to generate a response comprising one or more tasks requiring execution at the communication sending device, wherein the response is configured to result in the cost to the sender of the spam communication; and
   send the generated response comprising the one or more tasks to the communication sending device, while causing the spam communication to be withheld from the communication receiving device.

2. The non-transitory computer readable medium as set forth in claim 1, wherein the executable code, when executed by the at least one processor, further causes the at least one processor to determine one of a plurality of security threat levels associated with the spam communication.

3. The non-transitory computer readable medium as set forth in claim 2, wherein the one or more tasks comprise a single task when the determined one of the plurality of security threat levels is low and the executable code, when executed by the at least one processor, further causes the at least one processor to send the generated response comprising the single task to the communication sending device.

4. The non-transitory computer readable medium as set forth in claim 2, wherein the one or more tasks comprise a plurality of tasks when the determined one of the plurality of security threat levels is high and the executable code, when executed by the at least one processor, further causes the at least one processor to send the generated response comprising the plurality of tasks to the communication sending device.

5. The non-transitory computer readable medium as set forth in claim 2, wherein the executable code, when executed by the at least one processor, further causes the at least one processor to determine the one of the plurality of security threat levels based on data associated with one or more of the spam communication, the sender, or the communication sending device.

6. The non-transitory computer readable medium as set forth in claim 2, wherein the executable code, when executed by the at least one processor, further causes the at least one processor to determine a number of the one or more tasks based on the one of the plurality of security threat levels.

7. The non-transitory computer readable medium as set forth in claim 1, wherein the spam communication is an e-mail and the executable code, when executed by the at least one processor, further causes the at least one processor to apply the trained artificial intelligence model to one or more characteristics of the e-mail comprising a source Internet protocol (IP) address identified in the e-mail, a domain name of an e-mail address from which the e-mail originated, content of the e-mail, a type of the e-mail, or a format of the e-mail.

8. The non-transitory computer readable medium as set forth in claim 1, wherein the executable code, when executed by the at least one processor, further causes the at least one processor to apply the trained artificial intelligence model to one or more characteristics of the spam communication to generate the response.

9. The non-transitory computer readable medium as set forth in claim 1, wherein the executable code, when executed by the at least one processor, further causes the at least one processor to deliver the withheld spam communication to the communication receiving device following execution of the one or more tasks.

10. The non-transitory computer readable medium as set forth in claim 1, wherein the one or more tasks are executed by the communication sending device.

11. The non-transitory computer readable medium as set forth in claim 1, wherein the one or more tasks are executed by a user based on an input to the communication sending device.

12. The non-transitory computer readable medium as set forth in claim 1, wherein the one or more tasks require the communication sending device to send another response to the generated response and the executable code, when executed by the at least one processor, further causes the at least one processor to deliver the withheld spam communication to the communication receiving device following receipt of the other response from the communication sending device.

13. The non-transitory computer readable medium as set forth in claim 1, wherein the executable code, when executed by the at least one processor, further causes the at least one processor to apply another trained artificial intelligence model to one or more characteristics of the spam communication to identify the spam communication.

14. The non-transitory computer readable medium as set forth in claim 1, wherein the executable code, when executed by the at least one processor, further causes the at least one processor to generate the response without user intervention.

15. The non-transitory computer readable medium as set forth in claim 1, wherein the cost comprises a computation cost.

16. The non-transitory computer readable medium as set forth in claim 1, wherein the cost comprises a temporal cost.

17. The non-transitory computer readable medium as set forth in claim 1, wherein the cost comprises a financial cost.

18. A spam communication manager apparatus, comprising a memory comprising instructions stored thereon for creating a cost to a sender of a spam communication and a processor coupled to the memory and configured to execute the stored instructions to:
  intercept the spam communication originating from a communication sending device of the sender of the spam communication and directed to a communication receiving device;
  apply a trained artificial intelligence model to generate a response comprising one or more tasks requiring execution at the communication sending device, wherein the response is configured to result in the cost to the sender of the spam communication; and
  send the generated response comprising the one or more tasks to the communication sending device, while causing the intercepted spam communication to be withheld from the communication receiving device.

19. A method for creating a cost to a sender of a spam communication, the method implemented by one or more spam communication manager apparatuses and comprising:
  intercepting the spam communication originating from a communication sending device of the sender of the spam communication and directed to a communication receiving device;
  applying a trained artificial intelligence model to generate a response comprising one or more tasks requiring execution at the communication sending device, wherein the response is configured to result in the cost to the sender of the spam communication; and
  sending the generated response comprising the one or more tasks to the communication sending device, while causing the intercepted spam communication to be withheld from the communication receiving device.

* * * * *